US012530615B2

(12) United States Patent
Harrison

(10) Patent No.: US 12,530,615 B2
(45) Date of Patent: Jan. 20, 2026

(54) INTELLIGENT OVERSIGHT OF MULTI-PARTY ENGAGEMENTS

(71) Applicant: Salesforce, Inc., San Francisco, CA (US)

(72) Inventor: Daniel Thomas Harrison, Ontario (CA)

(73) Assignee: Salesforce, Inc., San Francisco, CA (US)

( * ) Notice: Subject to any disclaimer, the term of this patent is extended or adjusted under 35 U.S.C. 154(b) by 1170 days.

(21) Appl. No.: 17/352,899

(22) Filed: Jun. 21, 2021

(65) Prior Publication Data

US 2022/0405630 A1      Dec. 22, 2022

(51) Int. Cl.
*G06N 20/00* (2019.01)
*G06N 5/04* (2023.01)
*G06Q 10/0633* (2023.01)
*G06Q 10/0639* (2023.01)

(52) U.S. Cl.
CPC ............ *G06N 20/00* (2019.01); *G06N 5/04* (2013.01); *G06Q 10/0633* (2013.01); *G06Q 10/0639* (2013.01)

(58) Field of Classification Search
CPC ...... G06N 20/00; G06N 5/04; G06Q 10/0633; G06Q 10/0639
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |

(Continued)

*Primary Examiner* — Kamran Afshar
*Assistant Examiner* — Lokesha Patel
(74) *Attorney, Agent, or Firm* — Kwan & Olynick LLP

(57) ABSTRACT

Artificial intelligence (AI) oversight may be added to a multiparty engagement, such as a conference between devices having user interfaces. The AI may apply visual indicators, e.g., informational elements, recommendations, or other data, on one or more user interface. Visual indicators assist with presenting or participating in a conference. Visual indicators may highlight, e.g., AI-determined attributes of participants in the conference. Attributes may be derived physiological characteristics of participants, such as mood, apparent interest, paying attention, as well as AI-derived data from analyzing data sources, such as data about the participant, past engagements, time zone, name/title and other information to facilitate interaction with the participant. The AI may also review data for past deals, resume, project plans, social media, customer relationship manager data, and the like and develop models to allow it to monitor a conference and provide recommendations to facilitate conference goals.

23 Claims, 4 Drawing Sheets

(56) References Cited

U.S. PATENT DOCUMENTS

| | | |
|---|---|---|
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 10,805,309 B2 | 10/2020 | Harrison |
| 11,188,838 B2 | 11/2021 | Harrison |
| 11,606,220 B2 * | 3/2023 | Jorasch ............... H04L 65/403 |
| 12,094,018 B1 * | 9/2024 | O'Malley ............ G06Q 50/184 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |

(56) References Cited

U.S. PATENT DOCUMENTS

| | | |
|---|---|---|
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky |
| 2011/0247051 A1 | 10/2011 | Bulumulla |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0075004 A1* | 3/2014 | Van Dusen ....... G06F 16/90335 709/223 |
| 2014/0359537 A1 | 12/2014 | Jackobson et al. |
| 2019/0236297 A1 | 8/2019 | Harrison |
| 2020/0019898 A1 | 1/2020 | Harrison |
| 2020/0027005 A1 | 1/2020 | Harrison |
| 2020/0090055 A1 | 3/2020 | Harrison |
| 2020/0242595 A1 | 7/2020 | Harrison |
| 2020/0311273 A1 | 10/2020 | Harrison |
| 2021/0019982 A1* | 1/2021 | Todd .................. H04N 21/2343 |
| 2021/0051037 A1* | 2/2021 | Atkins ................ G06V 10/993 |
| 2021/0217001 A1 | 7/2021 | Harrison |
| 2021/0241307 A1 | 8/2021 | Harrison |
| 2021/0304259 A1 | 9/2021 | Harrison |
| 2021/0326528 A1 | 10/2021 | Harrison |
| 2021/0326589 A1 | 10/2021 | Harrison |

* cited by examiner

INTELLIGENT OVERSIGHT OF MULTI-PARTY ENGAGEMENTS

TECHNICAL FIELD

One or more implementations relate to the field of multiparty engagements with a network based application program; and more specifically, to AI recommendations added to one or more user interface to facilitate multiparty engagement.

BACKGROUND ART

Most software, whether provided as a standalone application program, browser based, web based, within and/or as part of a platform or combination of the foregoing, provides some sort of interface, e.g., physical (such as a display screen), virtual (augmented, virtual) reality, and/or some combination of physical and virtual. When the software provides a multiparty engagement, such as a video type of conference between multiple people each using their own software, computer, or audio devices (phone) to engage in the conference, it is sometimes difficult to keep track of the purpose of the conference, the goals of each person on the conference (e.g., entity representation needed, decisions to be made, etc.), whether the goals were met (e.g., was a decision made, was the decision made by the right person or people, etc.), degree of engagement, etc.

Tracking progress within and outcomes of a multiparty engagement, such as a conference, become increasingly difficult as the scale of a conference grows. In recent times, there has been a shift of workforces from physical offices with face-to-face conference, to virtual positions with online meetings now being commonplace. Virtual conferences, once an occasional event, has now become the norm. And as such the size and frequency of conferences has increased, so has the complexity of tracking conferences, activity within the conference, effectiveness of a conference, and understanding conference outcomes in light of organizational goals.

BRIEF DESCRIPTION OF THE DRAWINGS

The following figures use like reference numbers to refer to like elements. Although the following figures depict various example implementations, alternative implementations are within the spirit and scope of the appended claims. In the drawings:

DETAILED DESCRIPTION

The following description describes implementations for providing a network-based conference between devices of which some have, among other features, a User Interface (UI) that may be presented along with a dynamically updateable informational elements that may be used to display information about conference participants. As will be discussed in more detail below, a network-aware and/or network-coupled computing platform may execute applications for a device, where the computing platform includes one or more application program to provide the conference and/or access to the conference.

It will be appreciated the term "execute" includes various techniques for making the application program available, including a processor performing operations stored in a file, as well as a computing platform providing an environment that may interpret instructions. For example, a computing platform may execute or otherwise make available a network application program such as a browser, which may be an "Internet" browser type of program that may evaluate/interpret/execute/etc. network accessible resources such as those written in markup languages such as Hypertext Markup Language (HTML), eXtensible Markup Language (XML), eXtensible Hypertext Markup Language (XHTML), etc., written in or combined with programming languages such as Java, Javascript, TypeScript, PHP, etc., or written in another language. The computing platform may also provide and/or otherwise make available a network application program as a standalone application program that may communicate with other application programs and/or services or resources over a network.

It will be appreciated there are many different languages that may be used and these are just an exemplary few that are known to those skilled in the art. It will be appreciated in one embodiment, a device may refer to where a browser or other application program is being executed (and accessing remote network resources, servers, etc.), and there may be one or more user of the device that interacts with the device to generate, e.g., operations, commands and/or user interface activity. It will be appreciated a device need not have a local user operating it, and that the device may be under operation from another source or location, such as a remote user, remote access (e.g., VPN), virtual terminal, etc. It will also be appreciated the device may be self-directed such as by way of an Artificial Intelligence, Expert System, or other autonomous action system.

To help a user make use of, for example, a multiparty engagement application program, such as a video conference application, a UI associated with a participant may be overlaid with informational elements to help the user better appreciate various states that may be associated with a conference and/or participants to the conference.

Figure 1:
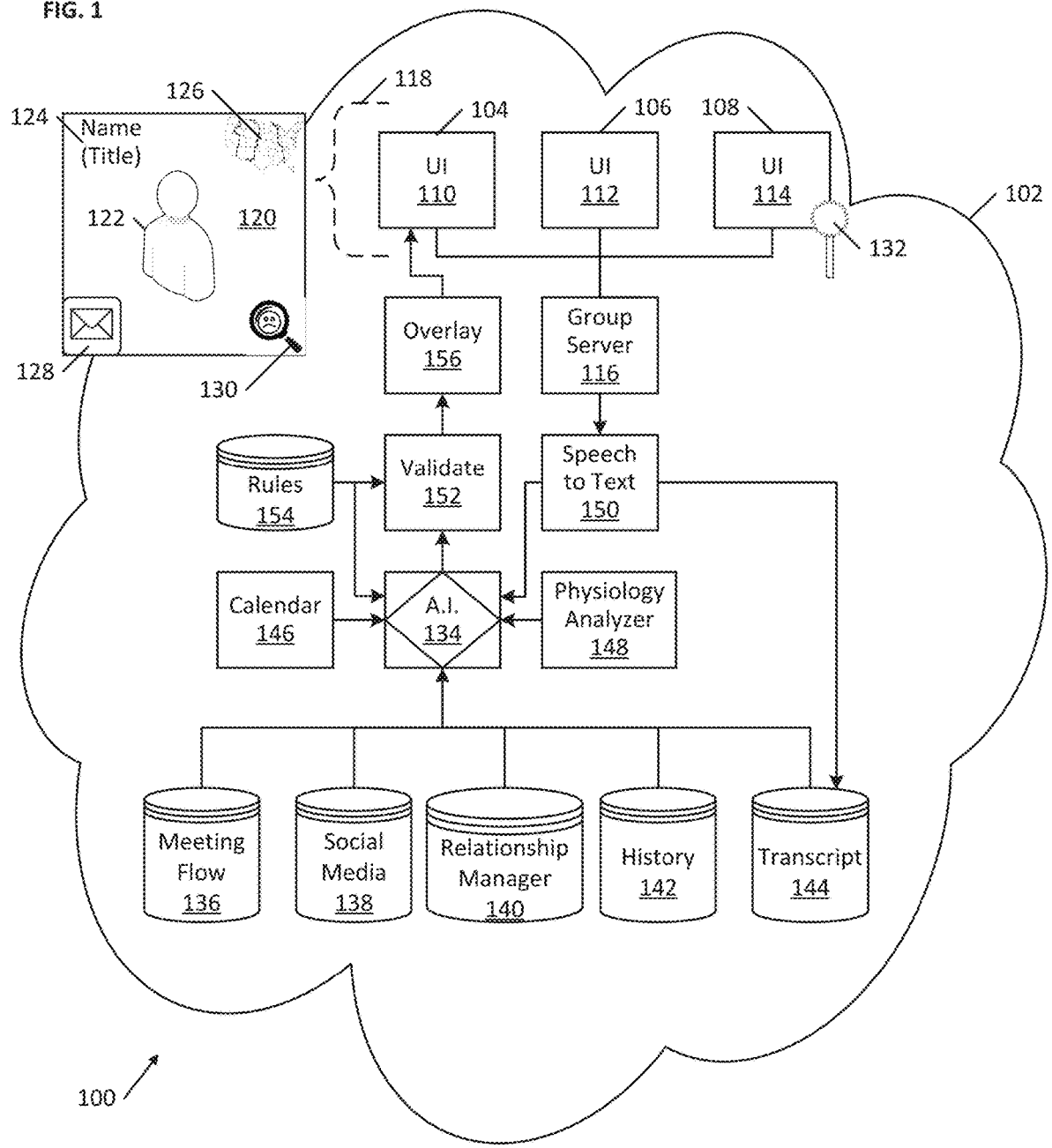
FIG. 1 illustrates a system 100 of devices engaged in a multiparty engagement according to example implementations.

FIG. 1 illustrates a system 100 of devices engaged in a multiparty engagement according to example implementations. An engagement may, as discussed above, be a conference, such as a video conference or other engagement in which multiple entities (machines, artificial intelligence (AI), people, etc.) directly and/or indirectly interconnect over one or more network to participate in the engagement. For illustrative convenience, the various devices in FIG. 1 are presented within a cloud 102 intended to represent various wired and/or wireless networks or communication technologies that may be used to interconnect or otherwise communicatively couple devices of system 100. It will be appreciated the illustrated connections between elements of FIG. 1 are indicative of data flow or other communication that may occur between the elements. Further, while elements are illustrated as separate elements, this is for expository convenience. It will be appreciated elements may be implemented within separate machines and/or variously combined and/or disposed within one or more device as desired.

In the illustrated exemplary implementation, let us assume multiple devices 104-108 participate in a conference, and one or more participants engage in the conference at least in part through use of a user interface (UI) 110-114. It will be appreciated the UI may be presented in a variety of ways, including by way of example only, on a display or monitor associated with a device, on a display incorporated into a device (e.g., a tablet, all-in-one, etc,), projected (e.g., as a 2D, 3D, holographic, etc. display), provided to a wearable display (e.g., smart glasses, digital contact lenses, virtual reality goggles, retinal or cortex implant, etc.), provided as part of an augmented reality overlay to one or more of the preceding UI environments, audio indicators (for visual impaired), etc. The conference may be hosted by a separate/common group server 116 to which each of participant devices 104-108 may connect, or the conference may be hosted by one or more of the participant devices, e.g., hosting may be distributed among one or more participant devices. The conference may be, for example, a video conference, in which some number of people and/or other machines or entities get together. It will be appreciated the conference may be casual, or for a particular purpose, e.g., to satisfy a conference goal(s) or agenda. The conference may be standalone, or one in a series of conferences, e.g., conferences held for a deal, transaction, job interview, project meetings, or other occurrence with a planned series of meetings to address one or more issues to be resolved. Exemplary conferences related to a deal could be initial engagement/greeting (prospecting), qualification, demo, proposal, negotiation, and closeout/agreement.

In the illustrated exemplary implementation, UI 110 for one participant is shown blown out 118 as item 120, in which is displayed another participant 122, e.g., it could be a user of participant device 106. As would be typical of a video conference, the UI 120 may display other participants and/or informational elements 124-130 indicating data about other participants in the conference, status related to the conference, recommendations to a user for UI 120, etc. The informational elements may correspond to information known, derived, and/or inferred about participant 122 (or other participants or the conference). The content associated with the informational elements may change depending on who or what is being displayed in the UI 120. Other UIs, e.g., items 112, 114, may perform some or all features of UI 120, or they may operate differently. Various accesses and/or events corresponding to interactions within a UI 110-114 or activity in a conference may change the content of a UI. For example, if conference participant device 108 is operated by participant 122, and the device has an associated microphone 132 that picks up speech from the participant 122, the UI 120 may display the participant in the UI. The UI may dynamically update informational elements 124-130 with information that is known, derived and/or inferred about user 122.

As illustrated, an artificial intelligence (AI) 134, machine learning, or other reasoning system, is communicatively coupled with a variety of information sources, e.g., databases 136-144, calendar(s) system(s) 146, physiology analyzer(s) 148, etc. These sources 136-148 are exemplary, and it will be appreciated the AI may receive and analyze data from arbitrary sources. The AI may be a combination of one or more machine learning systems, e.g., a neural network, deep neural network, convolutional neural network, "deep learning" or other type of reasoning system that may be used to provide input to one or more participants in a conference. Exemplary deep learning AIs include Convolutional Neural Network (CNN), K-nearest neighbor (KNN), Artificial Neural Network (ANN), Recurrent Neural Network (RNN), Deep Neural Network (DNN), Deep Belief Networks (DBN), as well as many others. It will be understood the AI may learn and/or train from supervised and unsupervised learning approaches (see, e.g., FIG. 4 discussion). Assuming the AI is provided access to the information sources 136-148, and as appropriate to the type of AI utilized, it is assumed to have been trained where necessary, and will continue to train/learn as it monitors conferences and accesses the various inputs and information sources.

The meeting flow database 136 source may include data describing events and timing to occur within a particular conference, e.g., a few minutes for people to join the conference, a few minutes for small talk, time for holding a substantive portion of the conference, and time for ending the conference and establishing next steps to be taken, e.g., scheduling the next conference. For the small talk, the AI 134 may access, or have been accessing and analyzing, social media 138 of meeting participants, e.g., users of devices 112, 114, and provide small talk recommendations in UI 110 based on the analysis. It will be appreciated many techniques may be used for identifying active, trending, or otherwise potentially interesting content present in the news, social media 138, or other sources of which an AI may recommend some for discussion. After initial conference spin up, the substantive meeting may progress. During a substantive portion of the conference, the AI may monitor participants to evaluate how well the conference is proceeding.

It will be appreciated the system 100 may include a conference host server (e.g., a video conference server/service such as Zoom by Zoom Video Communications, Facebook Portal by Facebook Inc., WebEx by Cisco, etc.) that displays a conference UI on one or more user interface 110-114 through a browser, separate conference application, separate hardware device, etc., and a machine (which may be providing the AI 134) may provide a monitoring service to monitor a conference. It will be appreciated the monitoring service may, in whole or in part, operate on, for example, the conference host server, a third party server (e.g., a system and/or platform provided by salesforce.com, Inc. or other party), or a user device 104-108, or other machine. The machine that monitors the conference may generate data to cause or otherwise assist the AI to makes recommendations and/or the machine may make recommendations for display in one or more user interface. In various implementations the machine monitoring the conference may invoke a machine learning model to monitor the conference and to perform an artificial intelligence analysis of the conference, such as of activity related to a key participant to the conference, and to receive from the machine learning model the artificial intelligence analysis.

In some implementations, all participants are monitored, and in others, selected participants are identified for monitoring. Monitored participant data, such as for a key participant, may be used at least in part to provide recommendations, next steps, targeted follow-up meetings, etc. during the conference. Various techniques may be used to identify the key participant(s). A relationship manager source 140, for example, may contain information to assist with identifying key participants, goals for a meeting or conference as well as track data relevant to running a business. A relationship manager, generally speaking, includes one or more systems that track customers, leads, deals, customer service, shipping, marketing, social media, Human Resources (HR) activities, etc. A relationship manager generally may be referred to as a system providing "business intelligence", and is sometimes referred to as a "Business Systems of Record (BSR)", and may aid finding potential leads, efficiently engaging potential customers, and tracking engagements for success/failure. Thus, for example, a relationship manager may track a deal cycle, such as from Prospecting (meet a potential customer), to Qualification (more detailed discussion of customer needs), to Demo (showing what can be offered to potential customer), to Proposal meeting (discuss various features or options available to the potential customer), to Negotiation (work out the terms of the contract). A post Negotiation conference may be held to discuss deal success or failure. As another example, the relationship manager may track HR activity related to hiring an employee, and tracked stages may include Sourcing (finding the candidate), Selecting (determining who to interview), Initial Interview (first call with Recruiter), Panel Interview (detailed interview with experts), Manager Interview (hiring manager discussion), Reference Check (discussion with references), Offer (discussion on the terms of employment), and On-boarding (first day expectation). Depending on the type of activity being tracked the relationship manager may identify a key participant(s) or other data on which an AI may analyze when making recommendations, determining next steps, etc.

In some exemplary implementations, the relationship manager may include and/or provide a Supply Chain Management (SCM) solution, where tracked data may include, for example, stage, an order, size of an order, whether the data relates to a new product (or new engagement of some type) or a repeating order, contacts who have been involved with one or more previous orders, shipping service being used, carbon footprint of the product, etc. The relationship manager may also include and/or provide Project Management Software (PMS), where tracked data may include project stage, known risk factors, project milestones/tasks, people and/or entities associated with a milestones (where absence from a conference related to a milestone/task is a consideration for the AI), other project dependencies, and the like. The relationship manager may also include and/or an Enterprise Resource Planning (ERP) where tracked data may include, for example, status of vendor approvals, financial tracking, inventory levels, forecast revenues or data from other integrated systems, etc.

At each stage, different people would be considered key to a conference for a particular stage, and hence recommendations made by the AI would differ depending on the type of conference and the participants to the conference. The AI 134 may use other sources, such as calendar(s) 146, as the calendar may have been used to establish the conference and will identify the source of the conference, and provide email addresses for participants, and these addresses may be used to cross-reference participants to social media 138 data, past history 142, etc. where these sources may be used in conjunction with relationship manager 140 data to assist with identifying which participants are important in a particular stage. It is expected all of these data sources 136-148 (and others not illustrated) may be fed into or otherwise made available to an AI 134, such as a deep learning AI that can monitor conferences, learn when and how conferences are successful (or not), as well as adaptively provide feedback during a conference.

The AI 134 may also have access to one or more device to determine physiology characteristics of a person (illustrated as physiology analyzer 148) to monitor data about a person, e.g., facial expression, posture, body language, eye movement, head movement, fidgeting, hand tapping, speech patterns, word choice, neurotechnology link, vocal stress, etc., as well as derive other physical/psychological indicia based on monitoring of apparent breathing rate, heart rate, pupal dilation, eyelid blinks, sweating, swallowing, etc. Monitoring may be by way of cameras and/or other sensors in an environment, as well as through analysis of audio, video, photo, typing or other data that may be provided by participants to a conference. It will be appreciated the AI may be previously trained and provided physiology models to facilitate identifying a status for a participant, e.g., engaged, bored, nervous, excited, happy, unhappy, mad, etc. For example, extensive models have been created for monitoring, for example, shoppers in a store and these models may be applied in the conference context. The AI may be trained, based on specific experiences in a conference or series of conferences, to better understand how monitored participants relate to results from conferences. For example, at the conclusion of the conference, the AI may be updated with information about the conference result and/or participants. If the conference was supposed to seek agreement on an issue, which may be known from an agenda associated with the conference and/or based on what was said in the conference, the AI may be trained on whether agreement was reached, whether the meeting went smoothly, whether participants seemed appropriately engaged in the conference, etc. Such feedback may further train the AI to understand a conference and whether it is proceeding well.

In the illustrated implementation, the AI 134 also may access to real-time and historical transcript 144 data, which gets content from at least a speech to text 150 service. It will be appreciated the speech to text conversion may be performed by a service separate from the AI 134, or it may be performed by the AI since AIs are very good at understanding speech as will be appreciated by anyone that's used a smart assistant built into smart devices. Conversion to text may be performed, for example, by any number of techniques, such as with an end-to-end connectionist temporal classification (CTC) model, sequence-to-sequence (seq-2-seq) model, online sequence-to-sequence (e.g., a neural transducer), or other technology or neural network applying, e.g., acoustic, pronunciation, language, etc. models to perform speech recognition. It will be appreciated these are just a few simple examples of well-known speech to text systems and it will be appreciated other techniques may be used.

As discussed above, in the illustrated implementation, conference participant devices 104-108 may participate in the conference through a group server 116 hosting the conference. The group server may provide audio form the conference to a speech to text service, which transcribes the audio and stores it in the transcript 144 data. The AI may be configured to access current audio transcriptions from a conference, as well as historical transcripts. The AI may use current speech to evaluate a conference and automatically check off meeting agenda items as having been handled, e.g., recognize that a discussion mentioned key words or phrasing that indicates the conversation covered agenda items that, for example, were posted in the conference invitation. Based on the conversation evaluation, the AI may provide recommendations or notification, such as if an agenda item is not being discussed. As with any source 136-150, the AI may continually learn from these inputs, and be trained on conferences outcomes, and continue to learn to identify conferences trending toward a positive or negative outcome and provide recommendations/other output accordingly.

The AI 134 may apply a validate 152 tool to confirm recommendations and other data. This tool, while illustrated separately from the AI, may just be a feature provided by the AI. Validation may include confirming that a suggestion complies with internal corporate policy, or is in accord with the type of conference being held, is compliant with other conference participant rules, etc. For example, some AI recommendation(s) relating to facial recognition might not be presented to the UI if contrary to a corporate policy restricting use of facial recognition. Validation may be made with respect to rules 154 data, which may include requirements and other information. For example, a rule might say disregard recommendations relating to time if a high-ranking person is talking, e.g., a chief experience officer. Validation may also include applying rules that require additional steps, such as making certain statements in certain countries and/or circumstances when needed to comply with local laws and/or regulation, e.g., the AI recommending making a disclaimer in the context of it identifying forward looking statements made in a conference relating to price, estimates, quotes, etc. In a HR hiring context, for example, the AI may identify a discussion is or appears to be heading toward discussing impermissible topics such as age, gender, family status, or other topics not allowed in a specific country. Assuming a recommendation or other information to be presented is valid, an overlay 156 tool updates the informational elements 124-130 with a recommendation or other information. In this illustrated implementation, the informational elements may be presented on top of any data present in the UI 120 and hence the discussed augmentation is applicable to any activity within the UI. Augmenting a conference is just one example.

Thus, for example, assume participant 122 is a key participant. When the participant is active in the conference, the AI will have consulted its various sources to determine and/or derive information about the participant, and the UI 120 may be overlaid with informational elements that show, for example, the participant's name and title 124, which may be obtained, derived or otherwise inferred from the calendar 146 and/or social media 138, or from other sources. Knowing name and title will help with addressing and appreciating the role and, e.g., corporate status of the participant. Another informational element 126 may display, e.g., time zone data or upcoming public holidays identified for the participant, which will facilitate conversations about scheduling at the end of the call if the goal is another conference, as well as to assist with proper greetings, e.g., good morning/afternoon/evening. Another informational element may display a status icon 128 such as to identify a recent interaction (or lack of interaction) between the user of device 104 and the participant 122. For example, the AI may determine email logs indicate a message to the participant remains unopened (if that is known) or has not received a reply. The status icon (or another element not illustrated) may display a status to identify a participant's seniority in a relevant role, or tenure at the company, or other identifier to assist with appropriate language, acronyms, etc. are used for the participant's likely position and/or knowledge level in the relevant role.

Another informational element may include an indicator 130 to represent the AI analysis of the engagement of the key participant with the conference. As discussed above, physiology of a participant 122 may be analyzed by an analyzer 148 to determine gaze/body tracking, and other indicators used to determine if a participant is paying attention/interested, along with reviewing what's been spoken with speech to text 150, as well as how it was spoken (e.g., with voice stress tests and other analysis), to derive one or more indicator of participant engagement. In the illustrated exemplary implementation, the indicator 130 presents a frowning face, which may, for example, be derived from gaze tracking and/or other physiology of the participant, indicating the participant appears distracted or otherwise not paying attention. This may lead the AI to suggest the current portion of the conference should be repeated, or the current topic be recommended for a follow-up conference. It will be appreciated in some implementations standard AI models may be applied for many participants or specific models applied based on various criteria such as region, cultural expectation, job role, etc. Over time, repeated participants may also generate individual specific indicators that will be stored within the AI 134 and/or History 140 tracking system to further improve AI analysis.

Figure 2:
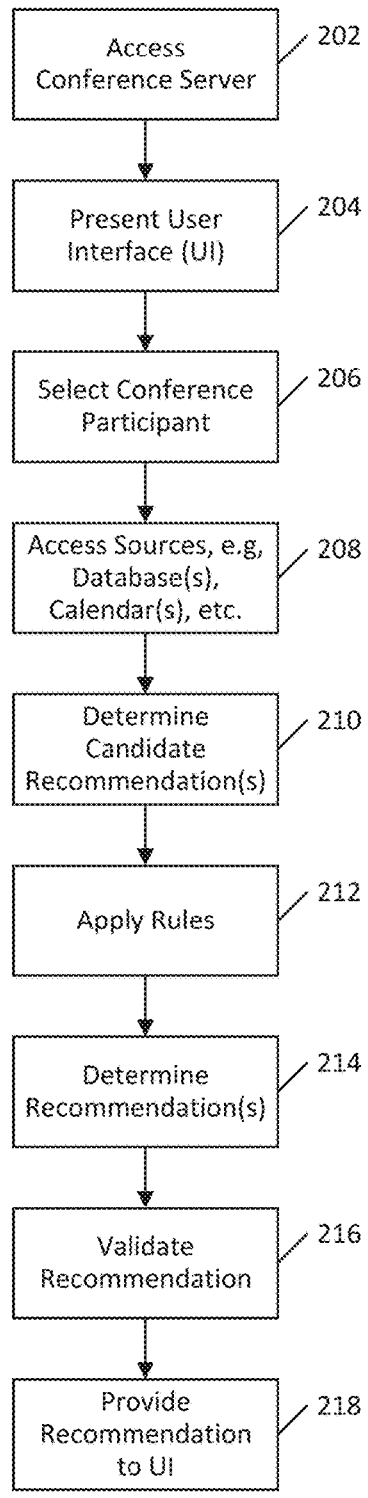
FIG. 2 is a flow diagram 200 according to some example implementations.

FIG. 2 illustrates a flow diagram 200 according to some example implementations. In this implementation, perspective focuses on a participant using, for example FIG. 1 device 104 receiving information from the AI 134 in UI 120. The participant device may access 202 the conference server. It will be appreciated the conference server may be a centralized server, e.g., FIG. 1 group server 116, hosting one or more conference for multiple, perhaps thousands, of devices. However, the conference server may instead be hosted in whole or in part by one or more of the participants to a conference.

After accessing the server, a user interface (UI) is presented 204, e.g., on a display or output associated with the device or user of the device. At least one conference participant is selected 206. The selected participant may be automatically performed, such as when a conference switches to show whoever is currently speaking. Alternatively, participants may be selected for display, if, for example, it is desired to view "key" (e.g. in some way deemed important) participants. Key status may be derived from analysis and/or cross-referencing of a variety of inputs, e.g., FIG. 1 sources 136-150. For example, participant status may be derived by examining and/or analyzing current conference attendance, reviewing organizational chart data known about participants, reviewing participant social media information, reviewing calendar information to determine, for example, required versus optional attendees, or to identify a stage in a multi-stage multi-conference engagement, accessing a relationship manager or other such data source to identify key stakeholders in, for example the current stage of a multi-conference engagement, etc. Alternatively, in larger conferences the UI may group participants into various group indicating level of engagement, importance to the conference, and depth of knowledge to help the presenter know if they are holistically focused on their target audience. For example, in an expert conference with 100+ individuals, groupings may help the presenter know at what technical level to engage a group, and appreciate if engagement is too high or low-level for the group. Some of these and/or other factors may be used to determine selecting a conference participant from all participants, or a group within the participants.

Various sources, including exemplary FIG. 1 sources 136-150, may be accessed by the AI to also determine information known and/or derived about the selected conference participant. The information may include past interactions with the participant, such as the status of emails, chats or other engagements. The analysis of the sources and previous interactions may be used to formulate candidate recommendations 210 during a conference. Recommendations may include determining what to place in informational elements associated with the UI being presented 204.

Given the potential for a large number of recommendations, in this implementation, an AI, e.g., FIG. 1 item 134, may apply 212 rules to filter candidate recommendations based on any number of criteria that may be assigned as desired. A simple filter, for example, would be to sort recommendations by priority concerns, such as whether a key participant is paying attention, whether important participants are missing from the conference, whether conversation appears off-track or against the goal of the conference, etc. In addition, rules may ensure recommendations comply with internal restrictions, HR guidelines, applicable laws, client requests, etc.

After applying 212 rules, a recommendation may be determined 214. In the illustrated implementation, the recommendation may be further validated 216. Similar to applying rules, validation provides an opportunity to adjust a recommendation, such as when the selected participant changes, or live speech recognition identifies a change in conversation that makes the recommendation stale or otherwise inapplicable. It will be appreciated recommendation validity may be a dynamic factor that changes as a deep learning AI monitors a conference and automatically filters recommendations based on current and past experience. Assuming a recommendation is deemed valid, it may be presented 218 in the UI. The presentation may be presented as an icon, text, audio message as the indicator with the user able to select that specific recommendation (clicking the icon) for additionally details and instruction of the recommendation. Thus, for example, the AI may load informational elements that assist with knowing a status of interactions with the selected 206 participant, time zone (helps correctly saying good morning/afternoon/evening to the participant, or clicking the time zone icon may provide which times are acceptable for meetings in that part of the world, such as if Sunday is a workday), track attentiveness of the participant with an icon that further expands to provide which indicators are dropping, etc. The AI may also provide recommendations such as, based on determined goals and conversation in the conference, the conference appears to be off-track, or an agenda goal was not discussed while the remaining time for the meeting is getting short, or based on historical interaction, and/or recommend what to say to the participant that might be persuasive in the current conference context (e.g., if this specific participants or similar participants may be more likely to respond with customer stories, technical details, or financial metrics).

Figure 3:
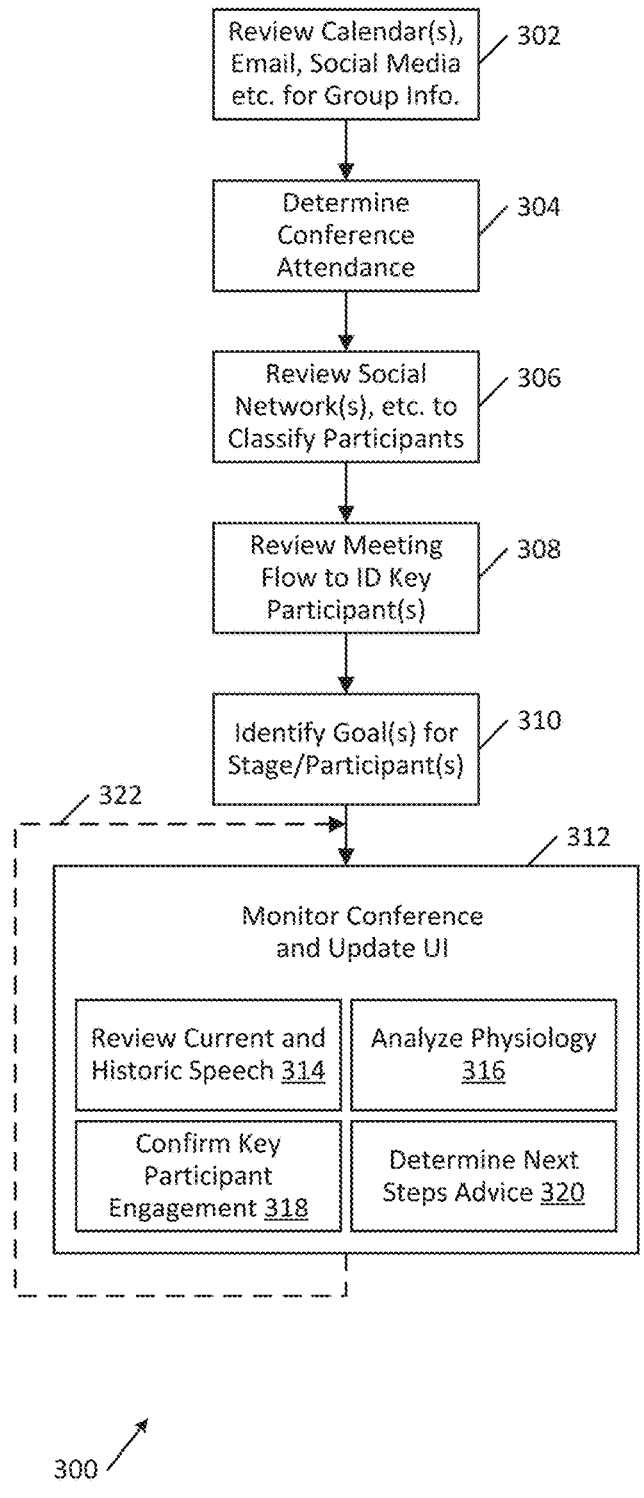
FIG. 3 is a flow diagram 300 according to some example implementations.

FIG. 3 illustrates a flow diagram 300 according to some example implementations. In this implementation, perspective focuses on an artificial intelligence (AI), e.g., FIG. 1 AI 134, monitoring and interacting with a conference. In order to provide useful informational elements and/or helpful recommendations, the AI accesses data sources, such as FIG. 1 items 136-150 to get an understanding of objectives and goals for a current conference, and also, as discussed above, to monitor the conference to determine how well the conference is meeting objectives for the conference.

The illustrated items 302-320 are presented without any required order except insofar as one item specifically depends on another. That is, some or all of the operations and actions related to one or more illustrated item (in this or any of the other figures) may be performed in parallel or in a different order than illustrated. In the exemplary illustrated implementation, a preliminary operation may be to review 302 calendars, email, or other documents to identify a group that will be holding a conference. It will be appreciated the AI may look at social media data, such as FIG. 1 item 138, and/or transcript 144 data and/or other sources that may indicate a person will be attending a conference. Based on such data, attendance for the conference may be determined 304. It will be appreciated participants may also be identified by the software and/or device used to participate in a conference, based on introductions spoken or otherwise given in the conference, as well as from analysis of a participant, e.g., by way of a digital fingerprint for the participant, e.g., based at least in part on voice recognition, biometric analysis, facial recognition (e.g., feature-based, view-based, etc.), or reviewing other participant features that may help identify the participant.

Once attendance at the conference is known/scheduled (as some data gathering and AI processing may be done prior to the conference), an AI may further review social network (or other online resources) to classify 306 conference participants. Classification may include cross-referencing data available to the AI with participants to determine what role a participant may have, e.g., sales person, technical support, finance, management, etc. as the perceived role of a participant may affect determinations of who may be a key participant in any given conference. In some implementations, several of the illustrated operations may access the same source of data and hence multiple operations may be performed substantially simultaneously/contemporaneously. The conference flow may be reviewed 308 to identify key participants at the conference. A conference may be a standalone event. The AI may determine from analyzing its various data sources, e.g., FIG. 1 items 136-150, a conference is one stage in a series of conferences related to a deal. In a series, it is likely at each stage different people would be considered key. Based at least in part on a determined stage, the AI may determine what participant(s) or type of participant is important in that conference stage, and provide analysis of the participant, e.g., evaluate the participant(s) for paying attention, engagement, buy-in, mood, language, etc.

For example, when prospecting, a prospecting conference may be lightweight, and a potential customer would be expected to be doing much of the talking to express their needs in the conference. The customer would be identified as a key participant and other conference participants would be expected to focus on the customer. Other entities associated with the customer, such as a business leader, may also be a key participant. The AI would present in a user interface, see, e.g., FIG. 1 item 120 or FIG. 2 item 204, information focused on the key participant(s) for the current conference. Compare this to holding a qualification conference. In a qualification conference, participants would include senior people likely to be making decisions regarding the deal, and conversation monitoring may confirm whether the conversation has an appropriate business context and content. In the illustrated example implementation, the meeting flow identifies 310 goals that should be met in the conference, and may call out specific milestones in conversation, such as making specific offers, discussing certain legal concerns, discussing press releases, etc. Goals may also be determined based on an agenda for the conference that has been shared, e.g., in a calendar invitation, in a shared document, past deal experience, or other source(s) describing the deal.

The AI, by monitoring 312 the conference communication, spoken or digital exchanges or non-verbal communication (e.g., nodding in agreement, holding up hand), may determine whether identified goals are being met, and whether they are being met in a timely fashion, and update the UI to assist with a smooth conference experience. As discussed above, the monitoring may be based at least in part on reviewing 314 current and historic speech to evaluate progress to goals, analyze 316 participant physiology to determine whether the conference is going well for various participants, as well as based on any feedback provided to the AI by participants during a conference. Of note, the various analysis of participants may also be used to assess truthfulness/evasion, and this may also factor in to recommendations and/or informational elements presented in the UI. The AI will also confirm 318 key participant engagement, and determine 320 next steps/advice based on its analysis. For example, if key participant engagement is lacking the AI may determine the next step is to place a warning in a UI that the conference is having issues, and recommend backtracking to when it was going perceived well and go back over a problematic portion of the conference. Monitoring and updating 312 the UI would repeat 322 throughout a conference, and the AI may dynamically adjust to events in the conference, and continue to provide recommendations and informational element data in a UI, e.g., FIG. 1 item 110.

It will be appreciated that as a deal progresses, key participants for a conference, and conference goals/milestones may change based. For example, in a demo meeting, the flow for this conference will be very different as a selling participant providing a demo will do much more talking, but the AI would analyze the conversation for breaks, requests for questions, and the like. And in this stage, the AI may particularly look for other participants that may be interfering with a conference, e.g., provide warnings if non-key participants are talking or distracting key participants from focusing on what is happening in the conference. For example, if a demo expert is explaining a feature, and an overzealous sales person is interrupting, the AI may flag the interruption to help ensure the conference stays on track. As a deal progresses, such as to a proposal stage, key participants would change again, and now a procurement team would be expected in the conference. The AI determining 304 attendance and reviewing 314 conference speech will facilitate evaluating whether the conference is attaining identified 310 goals for the proposal stage. It will also be appreciated a conference goal may change or evolve based on many factors, including based on what may be said in the conference, and the AI may adjust to the new goal(s) and advise accordingly.

It will be appreciated classifying 306 participants allows the AI to recognize the same words spoken by two different participants may mean different things. For example, a procurement person may talk about a discount or deal terms, and this would be different than if a high-ranking business person or demo expert were to talk about the same thing. If the wrong participants seem to be talking about an important issue, such as an identified deal goal, the AI may provide an alert in an informational element in the UI or otherwise provide a recommendation (or warning) in the UI or elsewhere. A recommendation could be to pull in the right person to respond to the conversation. If the procurement conference is successful, often a next conference covers negotiation, and may require legal expertise to work out the details of a contract and/or master service agreement. The AI may assist with developing the paperwork by, for example, analyzing the parties involved. If smaller companies are involved this may result in a recommendation of a particular playbook or template to use in starting negotiation, whereas for larger entities a different agreement or deal structure may be required, as well as different commitments that might need to be made and different legal considerations to take into account.

And as discussed above, monitoring conversation may be used to ensure strategic parts of the conversation, such as legal discussing specific terms, are not sidetracked. Further, since the AI has access to multiple sources, including relationship manager data, see, e.g., FIG. 1 item 140, the relationship manager may contain existing agreements between the participants and the AI may use this information assist with issues and/or recommending action on a current agreement at issue that seems related to past/other agreements. The AI may also look for discussion of potential legal pitfalls, such as when the participants span multiple countries and there may be multiple geo-specific rules and/or regulations to consider. If these issues are applicable and not discussed, the AI may provide informational elements in the UI, or other recommendation, so as to prompt discussion.

As discussed above, all interactions may serve to train the AI. After negotiation, a closeout (or "post mortem") conference may be held, and one or more document created that discusses the result of the conference(s) and whether the deal or other objective was deemed successful. The documented result, along with information concerning the result, will serve as metrics to be applied by the AI in evaluating future interactions, as well as to get feedback on in-meeting recommendations being valid and/or effective in improving a conference.

Figure 4:
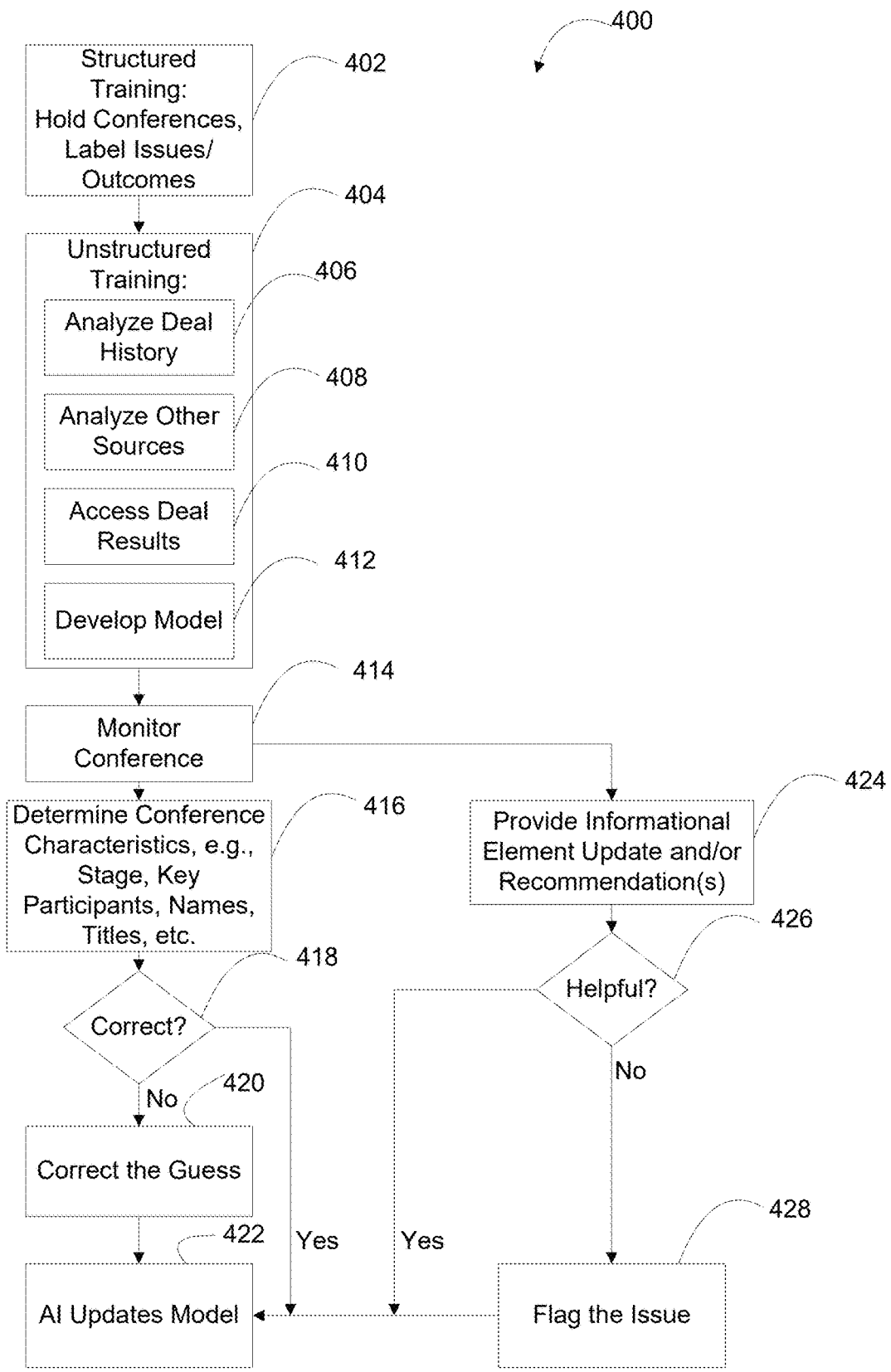
FIG. 4 is a flow diagram 400 according to some example implementations.

FIG. 4 is a flow diagram 400 according to some example implementations relating to training an AI, such as FIG. 1 AI 134. It is assumed the AI environment has the necessary hardware (e.g., central processing units (CPUs), graphics processing units (GPUs), server(s) system(s), etc.) and software to implement the AI, e.g., private AI software, or cloud-based AI such as Google Cloud AutoML, Amazon AWS SageMaker, Microsoft Learning Studio, just to name a few exemplary AI environments. These examples presume, for expository convenience, possible use of well-known cloud service providers to host the AI, but it will be appreciated there are many public and private options for servers/software that may be used.

It will be appreciated the AI 134 may simply be provided vast amounts of unstructured data, e.g., the entire history of deals that have been made, as well as all of the FIG. 1 sources 136-150 and be left to classify and label the data and self-discover patterns and relationships in the data, such as correlation between attendance, physiology, word choice, agendas, relationship manager content, etc. and deal results. However, in the illustrated implementation, some AI training may be performed. In this implementation, the AI may be provided structured training 402 as well as unstructured training 404. Structured training may include, in essence, performing business as usual, but where aspects of interest (e.g., areas in which the AI is wanted to later provide recommendations, informational elements, or other output of interest) may be labeled and flagged as having been successful, or not. This human-based data labeling may be performed in real time during a conference, or at a later time. While it is understood a deep learning AI does not necessarily need any human-derived input and/or classification of data in order to analyze and model it, providing specific labels and/or associating results will assist the AI more efficiently make connections and draw specific conclusions from data, to enable it to more quickly provide information during a conference.

In the structured training 402, assume a set of potential issues are known, e.g., what stage is this conference, incorrect attendance, lack of attention or boredom, no agreement, off-topic conversations, unclear agenda, missed agenda item, unclear meeting goal, meeting goal successful, tired participant, missing key participants, good or bad language, relationship manager goal met, HR interview rules followed, all closing project milestones discussed, etc. It will be appreciated these are just a few exemplary issues that may be labeled with appropriate outcomes. During a conference, when performing structured training, a trainer may in real time, near real time, or after the meeting, select various labels and indicate an outcome, e.g. positive/negative, successful/unsuccessful, yes/no, etc. In such fashion the AI may be provided with results that will facilitate it analyzing its sources and building a model to predict outcomes in a live conference.

After performing optional structured training 402, the AI may engage in what is referred to here as unstructured training 404. As will be appreciated by those skilled in the machine learning arts, and in particular, deep learning AI arts, an AI may be provided access to data for analysis, such as documents and other information regarding deal histories 406 identifying past deals and other engagements, various other sources 408, e.g., FIG. 1 items 136-150 (note history 142 data may provide histories 406), deal results 410, and other data available to the AI from which the AI may develop a model(s) 412 to represent patterns and relationships it identified in the data. While this is a simplified explanation of structured and unstructured training of an AI, it will be appreciated machine learning may be applied to develop one or more model to allow an AI to autonomously review past data, monitor current data from, for example, a conference, and use its models to make recommendations and/or update informational elements in a UI as discussed above.

After initial training 402, 404, the AI may monitor 414 a conference. During the conference, as discussed above with respect to the FIGS. 1-3 implementations, the AI may determine and/or infer 416 various characteristics of the conference, such as key participants, locating a participant name/title, participant time zone, a goal of the current conference, whether the conference appears to be on track/achieving the goal and/or schedule, etc. As the AI makes its determinations, an operator, e.g., of the FIG. 1 device 104 receiving information in FIG. 1 UI 120, may evaluate if the AI determinations are correct. If not, the operator may correct 420 the determination, and the AI may then update 422 its model accordingly, e.g., to track the error and this will lead to an adjustment in the evaluation of analyzed data (e.g., changing decision weighting). It will be appreciated the AI may operate in parallel, and hence while determining 416 conference characteristics, it may also provide 424 informational element updates (such as to display icons related to past interactions with a displayed key participant, to indicate apparent inattention, etc.) and/or provide recommendations (e.g., historically a certain meeting stage usually started with small talk/introductions, and the AI may prompt this in the UI (along with facts/data to make the small talk more relevant to participants).

If 426 the operator does not find it helpful, the issue can be flagged 404 and the AI again can update its model accordingly, which may be used by the AI as the conference proceeds, used as best practices in the model for future conference for this group of participants or completely different groups, or factored into other events in which a related recommendation or suggestion might be made. If the informational element/recommendation or other information from the AI was helpful, in the illustrated implementation this is also provided to the AI to update its model (to strengthen the associations that led to the particular output that was helpful). After updating the model, the AI may circle back to monitoring the conference. In such fashion, over time the AI may determine one or more model that more accurately reflects the historical experience across multi-stage conferences and enable it to provide meaningful information and/or recommendations to participants in an effort to move conferences and deals to a successful conclusion. It will be appreciated references herein to multi-stage conferences do not necessarily refer to a series of live events, such as a video/telephone conference, and some if not all engagements may be by way of email, web site access, document sharing, and the like. The AI may analyze these engagements and provide its recommendation(s). Thus in one example implementation, the UI may be an email interface over which a recommendation may be presented as discussed above for FIGS. 1-4.

Example Electronic Devices and Environments

Electronic Device and Machine-Readable Media

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 5A:
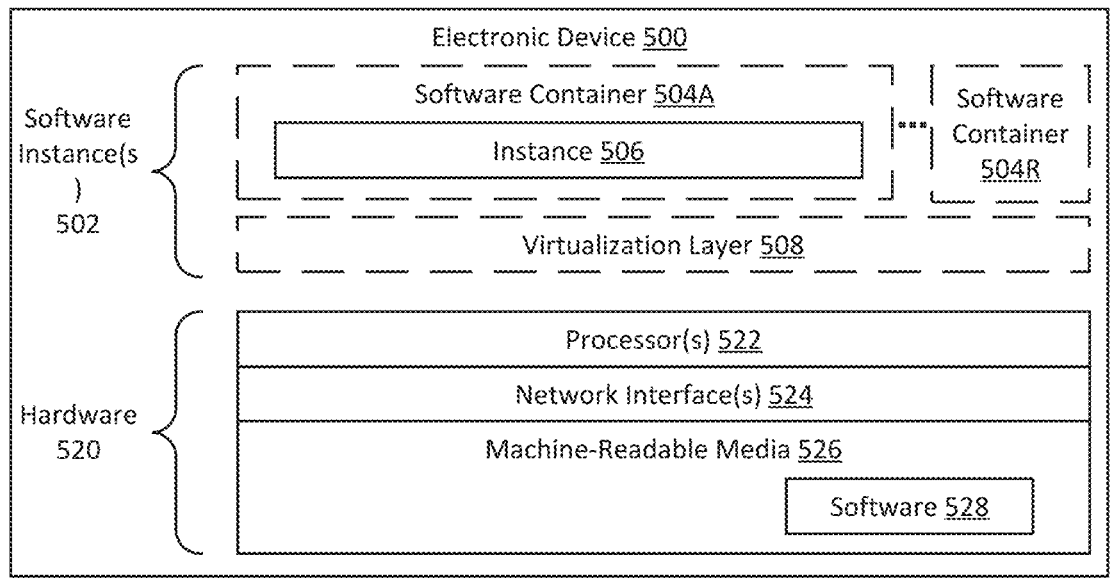
FIG. 5A is a block diagram illustrating an electronic device 500 according to some example implementations.

FIG. 5A is a block diagram illustrating an electronic device 500 according to some example implementations. FIG. 5A includes hardware 520 comprising a set of one or more processor(s) 522, a set of one or more network interfaces 524 (wireless and/or wired), and machine-readable media 526 having stored therein software 528 (which includes instructions executable by the set of one or more processor(s) 522). The machine-readable media 526 may include non-transitory and/or transitory machine-readable media. Each of the previously described clients and an artificial intelligence (AI) service, e.g., the FIG. 1 134 AI supporting a conference as discussed above, may be implemented in one or more electronic devices 500. In one implementation: 1) each of the clients is implemented in a separate one of the electronic devices 500 (e.g., in end user devices where the software 528 represents the software to implement clients to interface directly and/or indirectly with the AI service (e.g., software 528 represents a web browser, a native client, a portal, a command-line interface, and/or an application programming interface (API) based upon protocols such as Simple Object Access Protocol (SOAP), Representational State Transfer (REST), etc.)); 2) the AI service is implemented in a separate set of one or more of the electronic devices 500 (e.g., a set of one or more server devices where the software 528 represents the software to implement the AI service); and 3) in operation, the electronic devices implementing the clients and the AI service would be communicatively coupled (e.g., by a network) and would establish between them (or through one or more other layers and/or or other services) connections for submitting source data, e.g., from FIG. 1 items 136-150, and/or input from participants in a conference, to the AI service and returning recommendations and/or informational element data to be presented in one or more UI as discussed above. Other configurations of electronic devices may be used in other implementations (e.g., an implementation in which the client and the AI service are implemented on a single one of electronic device 500).

During operation, an instance of the software 528 (illustrated as instance 506 and referred to as a software instance; and in the more specific case of an application, as an application instance) is executed. In electronic devices that use compute virtualization, the set of one or more processor(s) 522 typically execute software to instantiate a virtualization layer 508 and one or more software container(s) 504A-504R (e.g., with operating system-level virtualization, the virtualization layer 508 may represent a container engine (such as Docker Engine by Docker, Inc. or rkt in Container Linux by Red Hat, Inc.) running on top of (or integrated into) an operating system, and it allows for the creation of multiple software containers 504A-504R (representing separate user space instances and also called virtualization engines, virtual private servers, or jails) that may each be used to execute a set of one or more applications; with full virtualization, the virtualization layer 508 represents a hypervisor (sometimes referred to as a virtual machine monitor (VMM)) or a hypervisor executing on top of a host operating system, and the software containers 504A-504R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 528 is executed within the software container 504A on the virtualization layer 508. In electronic devices where compute virtualization is not used, the instance 506 on top of a host operating system is executed on the "bare metal" electronic device 500. The instantiation of the instance 506, as well as the virtualization layer 508 and software containers 504A-504R if implemented, are collectively referred to as software instance(s) 502.

Alternative implementations of an electronic device may have numerous variations from that described above. For example, customized hardware and/or accelerators might also be used in an electronic device.

Example Environment

Figure 5B:
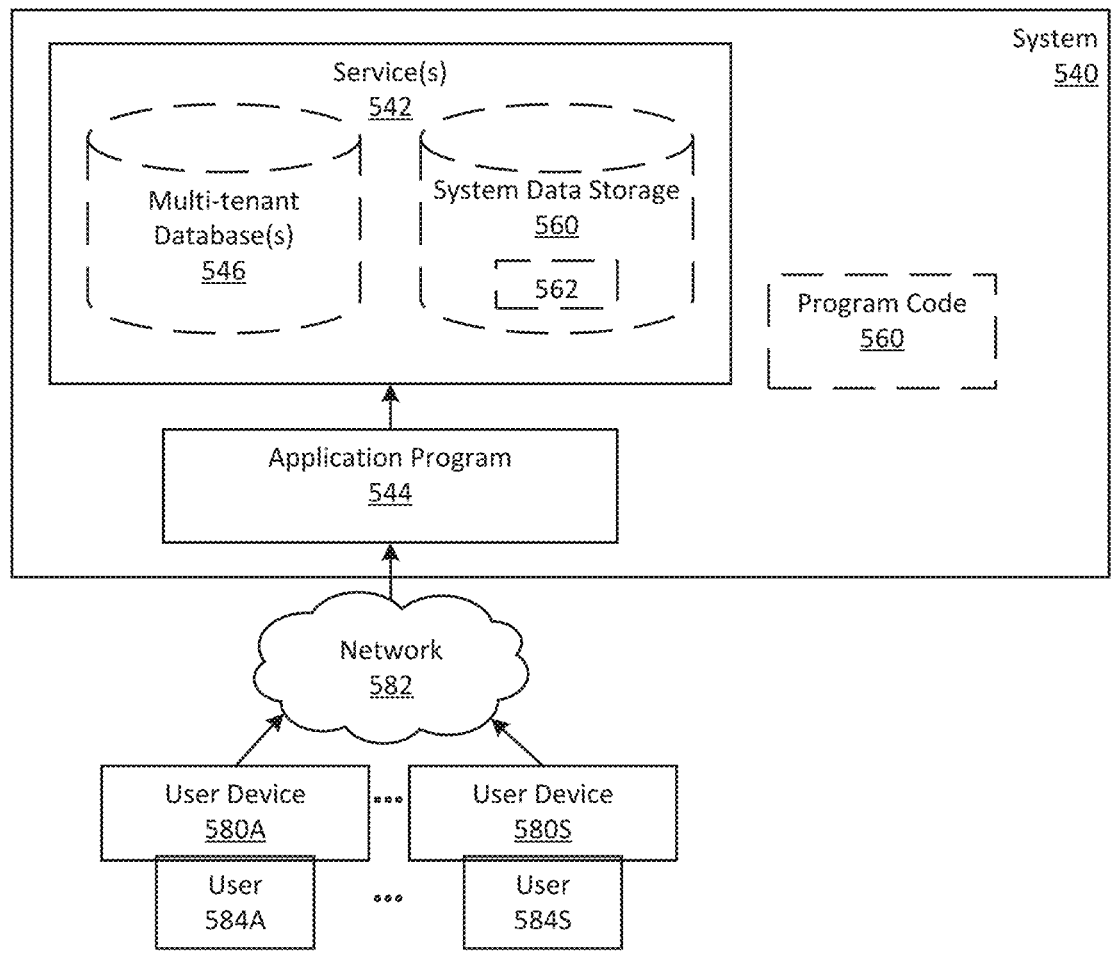
FIG. 5B is a block diagram of a deployment environment according to some example implementations.

FIG. 5B is a block diagram of a deployment environment according to some example implementations. A system 540 includes hardware (e.g., a set of one or more server devices) and software to provide service(s) 542, including the artificial intelligence (AI) multiparty engagement/conference support service. In some implementations the system 540 is in one or more datacenter(s). These datacenter(s) may be: 1) first party datacenter(s), which are datacenter(s) owned and/or operated by the same entity that provides and/or operates some or all of the software that provides the service(s) 542; and/or 2) third-party datacenter(s), which are datacenter(s) owned and/or operated by one or more different entities than the entity that provides the service(s) 542 (e.g., the different entities may host some or all of the software provided and/or operated by the entity that provides the service(s) 542). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 540 is coupled to user devices 580A-580S over a network 582. The service(s) 542 may be on-demand services that are made available to one or more of the users 584A-584S working for one or more entities other than the entity which owns and/or operates the on-demand services (those users sometimes referred to as outside users) so that those entities need not be concerned with building and/or maintaining a system, but instead may make use of the service(s) 542 when needed (e.g., when needed by the users 584A-584S). The service(s) 542 may communicate with each other and/or with one or more of the user devices 580A-580S via one or more APIs (e.g., a REST API). In some implementations, the user devices 580A-580S are operated by users 584A-584S, and each may be operated as a client device and/or a server device. In some implementations, one or more of the user devices 580A-580S are separate ones of the electronic device 500 or include one or more features of the electronic device 500. In some implementations user devices 580A-580S may operate as FIG. 1 items 104-108, and users 584A-584S correspond to users of items 104-108.

In some implementations, the system 540 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a relationship management system or service, a tenant may be a vendor using the relationship manager system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 540 is a multi-tenant cloud computing architecture supporting multiple services, such as one or more of the following types of services: Artificial intelligence (AI) multiparty engagement/conference support service; Dynamically updating service to update user interfaces based on the AI service; Relationship management; Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM). For example, system 540 may include an application platform 544 that enables PAAS for creating, managing, and executing one or more applications developed by the provider of the application platform 544, users accessing the system 540 via one or more of user devices 580A-580S, or third-party application developers accessing the system 540 via one or more of user devices 580A-580S.

In some implementations, one or more of the service(s) 542 may use one or more multi-tenant databases 546, as well as system data storage 550 for system data 552 accessible to system 540. In certain implementations, the system 540 includes a set of one or more servers that are running on server electronic devices and that are configured to handle requests for any authorized user associated with any tenant (there is no server affinity for a user and/or tenant to a specific server). The user devices 580A-580S communicate with the server(s) of system 540 to request and update tenant-level data and system-level data hosted by system 540, and in response the system 540 (e.g., one or more servers in system 540) automatically may generate one or more Structured Query Language (SQL) statements (e.g., one or more SQL queries) that are designed to access the desired information from the multi-tenant database(s) 546 and/or system data storage 550.

In some implementations, the service(s) 542 are implemented using virtual applications dynamically created at run time responsive to queries from the user devices 580A-580S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 560 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 544 includes an application setup mechanism that supports application developers' creation and management of applications, which may be saved as metadata by save routines. Invocations to such applications, including the artificial intelligence (AI) multiparty engagement/conference support service, and the UI updating service, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 582 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 540 and the user devices 580A-580S.

Each user device 580A-580S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 540. For example, the user interface device can be used to access data and applications hosted by system 540, and to perform searches on stored data, and otherwise allow one or more of users 584A-584S to interact with various GUI pages that may be presented to the one or more of users 584A-584S. User devices 580A-580S might communicate with system 540 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 580A-580S might include an HTTP client, commonly referred to as a "browser," for sending and receiving HTTP messages to and from server(s) of system 540, thus allowing users 584A-584S of the user devices 580A-580S to access, process and view information, pages and applications available to it from system 540 over network 582.

CONCLUSION

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations. The detailed description and claims may use the term "coupled,"

along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.). While the above description includes several example implementations assuming for expository convenience use of a browser and/or standalone software to implement and/or interact with all or selected aspects of the artificial intelligence (AI) multiparty engagement/conference support service, and the UI updating service, the invention is not limited to the implementations and interactions described and can be practiced with modification and alteration within the spirit and scope of the appended claims. The description is thus illustrative instead of limiting.

What is claimed is:

1. A computer system in a conference with other computer systems used by participants to a conference, the computer system configured to communicate with a host system to provide an artificial intelligence analysis of at least a key participant to the conference, the computer system comprising a set of one or more processors, and a memory coupled to the one or more processors for storing instructions that when executed by the one or more processors cause the computer system to perform operations comprising:
   receive, from the host system, the artificial intelligence analysis of at least the key participant;
   cause display of an interface for the conference, the interface including portions associated with at least one other computer system in the conference;
   cause overlay of the portions of the interface with one or more visual representations of meta-data associated with the at least one other computer system, the meta-data including at least a portion of the received artificial intelligence analysis;
   determine a recommendation based at least in part on the received artificial intelligence analysis;
   validate the recommendation against corporate policy rules;
   cause display in the interface the recommendation based at least in part on the received artificial intelligence analysis according to a result of validating the recommendation;
   determining a history of activity for the conference;
   identifying a current goal for a current conference segment based at least in part on the history of activity, wherein identifying the current goal is performed using a relationship manager source, the relationship manager source including information identifying one or more of: a customer, lead, or deal;
   comparing a current activity in the current conference segment to the current goal;
   evaluating the current activity to determine if it achieves the current goal; and
   determining the recommendation based at least in part on the evaluation of the current activity.

2. The computer system of claim 1, in which the conference has one or more stages, and the memory including further instructions to cause the computer system to perform operations comprising:
   identify an attendance for a current stage in the conference;
   update the key participant based at least in part on the attendance; and
   determine a next stage for the multi-stage conference based at least in part on the artificial intelligence analysis of an activity of at least the key participant in the current stage.

3. The computer system of claim 2, the memory including further instructions to cause the computer system to perform operations comprising:
   identifying a required participant for the current stage; and
   determining the next stage based at least in part on whether the required participant is in attendance.

4. The computer system of claim 1, wherein the computer systems include a server to perform the invoking the machine learning model to monitor the conference and to determine the artificial intelligence analysis.

5. The computer system of claim 1, wherein:
   the artificial intelligence analysis includes an engagement factor determined for at least the key participant; and
   the memory including further instructions to causing the computer system to perform operations comprising cause display of an alert in the interface based at least in part on the engagement factor.

6. The computer system of claim 1, the memory including further instructions to cause the computer system to perform operations comprising:
   monitoring a selected one or more of speech, physiology, physical motion, or history associated with one or more participants in the conference to determine an activity of the one or more participant; and
   determining the recommendation based at least in part on the monitoring.

7. The computer system of claim 1, the memory including further instructions to cause the computer system to perform operations comprising:
   inspecting an organizational hierarchy to determine a first metric;
   evaluating a calendar invitation to determine a second metric;
   lookup a social media content to determine a third metric;
   rank selected ones of the participants based at least in part on the first, second and third metric; and
   determine the key participant based at least in part on the rank.

8. The computer system of claim 1, in which a relationship management system tracks the one or more segment, the memory including further instructions to cause the computer system to perform operations comprising:
   lookup data corresponding to a tracking of the one or more segment in the relationship management system; and
   determine the history of activity based at least in part on the data.

9. A method to establish a conference with remote computer systems executing a conference application for respective participants of the conference, and engage in the conference based at least in part on receiving, from a host to be configured to invoke a machine learning model to monitor the conference, an artificial intelligence analysis of at least a key participant to the conference, the conference having one or more stages, the method comprising:
   receive the artificial intelligence analysis of at least the key participant;

cause display of an interface for the conference, the
interface including portions associated with at least one
other computer system in the conference;
cause overlay of the portions of the interface with one or
more visual representations of meta-data associated
with the at least one other computer system, the meta-
data including the received artificial intelligence analy-
sis;
determine a recommendation based at least in part on the
received artificial intelligence analysis;
validate the recommendation against corporate policy
rules;
cause display in the interface the recommendation accord-
ing to a result of validating the recommendation;
identify an attendance for a current stage in the confer-
ence;
update the key participant based at least in part on the
attendance; and
determine a next stage for the conference based at least in
part on the artificial intelligence analysis of an activity
of at least the key participant in the current stage.

10. The method of claim 9, further comprising:
identify a required participant for the current stage; and
determine the next stage based at least in part on whether
the required participant is in attendance.

11. The method of claim 9, wherein the computer system to receive the artificial intelligence analysis is to provide an artificial intelligence service.

12. The method of claim 9, in which the artificial intelligence analysis includes an engagement factor determined for at least the key participant, the method further comprising:
cause display of an alert in the interface based at least in
part on the engagement factor.

13. The method of claim 9, further comprising:
determine an activity of the one or more participant based
at least in part on monitor a selected one or more of
speech, physiology, physical motion, or history asso-
ciated of one or more participants in the conference;
and
determine the recommendation based at least in part on
the determined activity.

14. The method of claim 9, further comprising:
inspect an organizational hierarchy to determine a first
metric;
evaluate a calendar invitation to determine a second
metric;
lookup a social media content to determine a third metric;
rank selected ones of the participants based at least in part
on the first, second and third metric; and
determine the key participant based at least in part on the
rank.

15. The method of claim 9, in which a relationship management system tracks a multi-stage deal, the method further comprising:
determining, based on the relationship management sys-
tem, a history of activity for the multi-stage deal;
identifying a current goal for the conference based at least
in part the history of activity, wherein identifying the
current goal is performed using a relationship manager
source, the relationship manager source including
information identifying one or more of: a customer,
lead, or deal;
comparing a current activity in the conference;
evaluating the current activity for whether it achieves the
current goal; and
determining the recommendation based at least in part on
the evaluation of the current activity.

16. A non-transitory machine-readable storage medium that provides instructions for a computer system to engage in a conference with other computer systems used by participants to a conference, and to communicate over one or more network to access an artificial intelligence analysis of at least a key participant to the conference, the conference having one or more stages, the instructions, if executed by a processor, are configurable to cause said processor to perform operations comprising:
access the artificial intelligence analysis of at least the key
participant;
cause display of an interface for the conference, the
interface including portions associated with at least one
other computer system in the conference;
cause overlay of the portions of the interface with one or
more visual representations of meta-data associated
with the at least one other computer system, the meta-
data including at least portion of the received artificial
intelligence analysis;
determine a recommendation based at least in part on the
artificial intelligence analysis of at least the key par-
ticipant;
validate the recommendation against corporate policy
rules;
cause display in the interface the recommendation accord-
ing to a result of validating the recommendation;
identify an attendance for a current stage in the confer-
ence;
update the key participant based at least in part on the
attendance; and
determine a next stage for the conference based at least in
part on the artificial intelligence analysis of an activity
of at least the key participant in the current stage.

17. The medium of claim 16, the instructions further include instructions that, if executed by the processor are configurable to cause said processor to perform operations comprising:
identify a required participant for the current stage; and
determine the next stage based at least in part on whether
the required participant is in attendance.

18. The medium of claim 16, the instructions further include instructions that, if executed by the processor of the computer system to receive the artificial intelligence analysis, are configurable to cause said processor to perform operations comprising:
provide an artificial intelligence service.

19. The medium of claim 16, in which the artificial intelligence analysis includes an engagement factor determined for at least the key participant, and the instructions further include instructions that, if executed by the processor are configurable to cause said processor to perform operations comprising:
cause display of an alert in the interface based at least in
part on the engagement factor.

20. The medium of claim 16, the instructions further include instructions that, if executed by the processor are configurable to cause said processor to perform operations comprising:
monitor selected ones of speech, physiology, physical
motion, or history associated of one or more partici-
pants in the conference to determine an activity of the
one or more participant; and
determine the recommendation based at least in part on
the monitoring.

21. The medium of claim 16, the instructions further include instructions that, if executed by the processor are configurable to cause said processor to perform operations comprising:

inspecting an organizational hierarchy to determine a first metric;

evaluating a calendar invitation to determine a second metric;

lookup a social media content to determine a third metric;

ranking selected ones of the participants based at least in part on the first, second and third metric; and determining the key participant based at least in part on the rank.

22. The medium of claim 16, in which a relationship management system tracks a multi-stage deal, the instructions further include instructions that, if executed by the processor are configurable to cause said processor to perform operations comprising:

determining, based on the relationship management system, a history of activity for the multi-stage deal;

identifying a current goal for the conference based at least in part the history of activity, wherein identifying the current goal is performed using a relationship manager source, the relationship manager source including information identifying one or more of: a customer, lead, or deal;

evaluating a current activity in the conference for if it achieves the current goal; and determining the recommendation based at least in part on the evaluation.

23. The method of claim 9, wherein causing display in the interface the recommendation is performed if the recommendation is successfully validated.

* * * * *